US011110813B2

United States Patent
Hou et al.

(10) Patent No.: US 11,110,813 B2
(45) Date of Patent: Sep. 7, 2021

(54) CHARGING SYSTEM AND METHOD

(71) Applicants: STATE GRID CHONGQING ELECTRIC POWER CO. ELECTRIC POWER RESEARCH INSTITUTE, Chongqing (CN); STATE GRID CHONGQING ELECTRIC POWER COMPANY, Chongqing (CN); STATE GRID CORPORATION OF CHINA, Beijing (CN)

(72) Inventors: Xingzhe Hou, Chongqing (CN); Bin Zhu, Chongqing (CN); Jianguo Wang, Chongqing (CN); Guojun He, Chongqing (CN); Zhi Li, Chongqing (CN); Yongxiang Liu, Chongqing (CN); Hongliang Sun, Chongqing (CN); Yi Long, Chongqing (CN); Jing Zhang, Chongqing (CN); Huicai Wang, Chongqing (CN); Tingting Xu, Chongqing (CN); Li Zhou, Chongqing (CN); Lin Gong, Chongqing (CN); Yongliang Ji, Chongqing (CN)

(73) Assignees: STATE GRID CHONGQING ELECTRIC POWER CO. ELECTRIC POWER RESEARCH INSTITUTE; STATE GRID CHONGQING ELECTRIC POWER COMPANY; STATE GRID CORPORATION OF CHINA

( * ) Notice: Subject to any disclaimer, the term of this patent is extended or adjusted under 35 U.S.C. 154(b) by 880 days.

(21) Appl. No.: 15/751,972

(22) PCT Filed: Dec. 12, 2017

(86) PCT No.: PCT/CN2017/115744
§ 371 (c)(1),
(2) Date: Feb. 12, 2018

(87) PCT Pub. No.: WO2019/052040
PCT Pub. Date: Mar. 21, 2019

(65) Prior Publication Data
US 2020/0215927 A1 Jul. 9, 2020

(30) Foreign Application Priority Data

Sep. 13, 2017 (CN) .......................... 201710822945.5

(51) Int. Cl.
*B60L 53/35* (2019.01)
*B60L 53/66* (2019.01)
(Continued)

(52) U.S. Cl.
CPC ............... *B60L 53/35* (2019.02); *B60L 53/16* (2019.02); *B60L 53/18* (2019.02); *B60L 53/665* (2019.02);
(Continued)

(58) Field of Classification Search
CPC ........ B60L 53/35; B60L 53/665; B60L 53/16; B60L 53/18; B60L 2210/30; B60L 53/14;
(Continued)

(56) References Cited

U.S. PATENT DOCUMENTS

| 7,999,506 B1 * | 8/2011 | Hollar ..................... B60L 53/35 320/104 |
| 10,189,359 B2 * | 1/2019 | Lowenthal .............. B60L 55/00 |

(Continued)

FOREIGN PATENT DOCUMENTS

| CN | 204858680 | 12/2015 |
| CN | 205256033 | 5/2016 |

(Continued)

OTHER PUBLICATIONS

Patent Cooperation Treaty (PCT), International Search Report and Written Opinion for Application PCT/CN2017/115744 filed Dec. 12, 2017, dated Jun. 12, 2018, International Searching Authority, CN.

*Primary Examiner* — Stacy Whitmore
(74) *Attorney, Agent, or Firm* — McDonald Hopkins LLC

(57) ABSTRACT

A charging method includes that after receiving a charging request, a master control device arranges a parking space for an electric vehicle to be charged and sends a traction device a movement instruction generated from the charging request; the traction device drives, according to the movement instruction, a charging controller to move along a (Continued)

guide rail to above the electric vehicle to be charged; the master control device sends a cable transferring instruction to a cable transferring device and the cable transferring device starts to lower a cable; after the cable transferring device lowers the cable to a preset position, the master control device sends a stop instruction to the cable transferring device and the cable transferring device stops lowering the cable; and the cable charges the electric vehicle to be charged.

10 Claims, 7 Drawing Sheets

(51) Int. Cl.
| | |
|---|---|
| B60L 53/16 | (2019.01) |
| B60L 53/18 | (2019.01) |
| G05B 15/02 | (2006.01) |
| G06Q 10/06 | (2012.01) |
| G06Q 20/08 | (2012.01) |
| G06Q 50/06 | (2012.01) |
| H02J 7/02 | (2016.01) |

(52) U.S. Cl.
CPC ....... *G05B 15/02* (2013.01); *G06Q 10/06315* (2013.01); *G06Q 20/085* (2013.01); *G06Q 50/06* (2013.01); *H02J 7/02* (2013.01); *B60L 2210/30* (2013.01); *G06Q 2240/00* (2013.01)

(58) Field of Classification Search
CPC ... B60L 53/65; G05B 15/02; G06Q 10/06315; G06Q 20/085; G06Q 50/06; G06Q 2240/00; Y04S 30/14; H02J 7/0045; H02J 7/02; Y02T 10/7072; Y02T 10/70; Y02T 90/16; Y02T 90/12; Y02T 90/14
See application file for complete search history.

(56) References Cited

U.S. PATENT DOCUMENTS

| | | | | |
|---|---|---|---|---|
| 10,918,994 | B2* | 2/2021 | Crawford | F01N 3/2013 |
| 10,919,103 | B2* | 2/2021 | DuVal | B23K 9/1043 |
| 10,921,424 | B2* | 2/2021 | Longman | G01S 13/32 |
| 10,922,060 | B1* | 2/2021 | Ward | G06F 8/36 |
| 10,923,868 | B2* | 2/2021 | Shultz | H01R 25/142 |
| 10,923,919 | B2* | 2/2021 | Koeppe | H02J 3/46 |
| 10,923,947 | B2* | 2/2021 | Kutkut | H02J 9/061 |
| 10,924,011 | B2* | 2/2021 | Parto | H02M 3/33561 |
| 2011/0106294 | A1* | 5/2011 | Bebbington | B66F 9/0754 |
| | | | | 700/215 |
| 2011/0148350 | A1* | 6/2011 | Wegener | H02J 7/025 |
| | | | | 320/108 |
| 2012/0068664 | A1* | 3/2012 | Franzen | B60L 15/38 |
| | | | | 320/109 |
| 2013/0214738 | A1* | 8/2013 | Chen | H02J 5/00 |
| | | | | 320/109 |
| 2014/0253034 | A1 | 9/2014 | Kurimoto et al. | |
| 2016/0352113 | A1* | 12/2016 | Zhao | B60L 53/35 |
| 2018/0261017 | A1* | 9/2018 | Kim | G06Q 20/00 |
| 2019/0009679 | A1* | 1/2019 | Gaither | B60L 11/182 |
| 2019/0016312 | A1* | 1/2019 | Carlson | B60L 53/66 |
| 2019/0016384 | A1* | 1/2019 | Carlson | B60W 30/00 |
| 2020/0114773 | A1* | 4/2020 | McColl | B60L 53/35 |
| 2021/0044140 | A1* | 2/2021 | Nagabhushanrao | H02J 9/061 |

FOREIGN PATENT DOCUMENTS

| | | |
|---|---|---|
| CN | 106274530 | 1/2017 |
| CN | 206195413 | 5/2017 |
| CN | 107054147 | 8/2017 |

* cited by examiner

CHARGING SYSTEM AND METHOD

CROSS-REFERENCE TO RELATED APPLICATION

This application is a 35 U.S.C. 371 national stage filing of PCT Application No. PCT/CN2017/115,744 filed on Dec. 12, 2017, which claims priority to Chinese Patent Application No. 201710822945.5 filed on Sep. 13, 2017, each of which are incorporated herein in their entirety by reference.

TECHNICAL FIELD

The present disclosure relates to techniques for charging an electric vehicle and, in particular, to a charging system and charging method.

BACKGROUND

With the development of electric vehicles, the problem of difficulty and inconvenience in charging electric vehicles is becoming increasingly prominent. In the related art, electric vehicles are charged by stationary AC or DC charging spots. An AC charging spot is connected to a nearby 0.38 kV low-voltage distribution network and supplies 220 V or 380 V AC power. The AC power is outputted from the AC charging spot and then converted into DC power by an on-board charger. The 380 V AC power supplied by a public transformer or a private transformer is inputted into a DC charging spot. The DC charging spot outputs DC power required by batteries of electric vehicles.

In the related art, stationary charging spots are used to charge electric vehicles, and a user has to drive a vehicle to a place equipped with a charging spot to charge the vehicle and thus cannot change a user's parking time at a destination, a work place and a dwelling place into a charging time; the user drives away after the vehicle is fully charged, and a queuing time is long, causing much inconvenience. Moreover, if the vehicle does not leave immediately after having been fully charged and continues occupying the charging parking space, the charging spot will fail to charge a next vehicle, resulting in a low utilization rate of charging spots. Due to the constraints of distribution network capacities and land resources, it is impossible to build a large number of charging facilities to meet charging needs. In addition, disordered charging of traditional charging spots causes great pressure for a distribution network.

SUMMARY

The present disclosure provides a charging system and a charging method which break through space limitations during charging, eliminate the need of making a special trip to a charging station and are ideal for charging electric vehicles parked in a large parking lot. The charging system of the present disclosure has a higher utilization rate, reduces the number of charging spots to be constructed and saves distribution network reconstruction costs.

A charging method includes steps that after receiving a charging request, a master control device allocates a parking space for an electric vehicle to be charged and sends to a traction device a movement instruction generated from the charging request; the traction device drives, according to the movement instruction, a charging controller to move along a guide rail to a place above the electric vehicle to be charged; the master control device sends a cable transferring instruction to a cable transferring device and the cable transferring device starts to lower a cable; after the cable transferring device lowers the cable to a preset position, the master control device sends a stop instruction to the cable transferring device and the cable transferring device stops lowering the cable; and the cable charges the electric vehicle to be charged.

Optionally, the step in which after receiving the charging request, the master control device allocates the parking space for the electric vehicle to be charged and sends the traction device the movement instruction generated from the charging request includes that after receiving the charging request, the master control device allocates the parking space for a current electric vehicle to be charged, sorts a parked electric vehicle to be charged and the current electric vehicle to be charged according to the charging request and an existing charging request, generates the movement instruction according to a sorting result and sends the movement instruction to the traction device.

Optionally, the step in which the cable charges the electric vehicle to be charged includes that after charging the electric vehicle to be charged is completed, a metering device transmits a charging duration to the master control device and an accounting device transmits a charging fee to the master control device; and the master control device recognizes data transmitted by the charging device and the metering device and sends the data to a background management system, and the background management system sends order information generated from the charging request and pending-payment information generated from the charging fee to a charging user.

Optionally, the step in which the master control device sorts the parked electric vehicle to be charged and the current electric vehicle to be charged according to the charging request and the existing charging request includes that the master control device sorts the parked electric vehicle to be charged and the current electric vehicle to be charged according to at least one of an existing order situation, a predicted arrival time, an emergency degree of a charging request, a charging duration, a predicted parking time, a current load of a transformer and a determination on whether to accept an expedited fee.

Optionally, the charging request is sent by a mobile application (APP), a personal computer (PC) or a webpage of a charging website.

Optionally, the step in which the cable charges the electric vehicle to be charged further includes that a charging plug on the cable is inserted into a charging socket of the electric vehicle and the charging controller detects whether the charging plug is successfully connected to the charging socket of the electric vehicle; the cable charges the electric vehicle to be charged if it is detected that a connection is successful; and the charging controller prompts the charging user for a reconnection if it is detected that the connection is not successful.

Optionally, the step in which the charging controller prompts the charging user for the reconnection includes that it is detected whether the charging user makes the reconnection for a preset time; if no connection is made, the master control device stops responding to a current charging request and turns to respond to a next charging request; and if the connection is made, the charging controller detects whether the charging plug is successfully connected to the charging socket of the electric vehicle.

Optionally, the step in which if the connection is made, the charging controller detects whether the charging plug is successfully connected to the charging socket of the electric vehicle includes that it is determined whether the number of reconnections exceeds the preset number of times; if the preset number of times is exceeded, the master control device turns to respond to the next charging request; and if the preset number of times is not exceeded, the charging controller detects whether the charging plug is successfully connected to the charging socket of the electric vehicle.

The present disclosure further provides a charging system. The system includes an AC/DC device, a bus, a guide rail, a traction device, a positioning device, a power switch, a charging controller, a master control device, a man-machine interaction device, a metering and accounting device, a cable transferring device, a charging cable and a charging plug.

The bus is a DC bus or an AC bus. An AC input line is directly connected to the bus when the bus is the AC bus. The AC input line is connected to the AC/DC device when the bus is the DC bus.

The AC/DC device is connected to the master control device and configured to convert AC power of a distribution network into controllable DC power and transmit generated DC power to a DC bus.

The master control device is connected to the traction device and configured to control movement of the traction device.

The traction device is connected to the guide rail and configured to control a movement on the guide rail.

Multiple positioning devices are connected to the guide rail and configured to provide position information and transmit the position information to the master control device.

The charging controller is located on the guide rail and configured to be driven by the traction device to move along the guide rail to a place on above an electric vehicle to be charged.

The charging controller is connected to the master control device and configured to detect a connection between the charging plug and a charging socket of the electric vehicle, a charging timing sequence and fault handling.

The power switch is connected to the guide rail and the charging controller and configured to control a power connection or a power disconnection of the charging controller.

The master control device is connected to the man-machine interaction device and further configured to implement a man-machine interaction function.

The master control device is connected to the cable transferring device and further configured to control a transfer state of the cable connected to the charging controller.

The charging plug is connected to the cable and inserted into the charging socket of the electric vehicle to charge the electric vehicle.

Optionally, the charging controller includes at least one of an AC charging controller, a DC charging controller and an AC-DC integrated controller. The DC charging controller is configured to control a magnitude of an output voltage.

Optionally, the system further includes a communication device connected to the master control device and configured for communication between the master control device and a background management system.

Optionally, the metering and accounting device in the system is connected to the master control device and includes an accounting device and a metering device.

The accounting device is connected to the master control device and configured to transmit a charging fee to the master control device.

The metering device is connected to the master control device and configured to transmit a charging duration to the master control device.

The present disclosure further provides a computer program product including a computer program stored on a non-transient computer-readable storage medium, where the computer program includes program instructions that, when executed by a computer, enable the computer to execute any method described above.

The present disclosure further provides a computer-readable storage medium configured to store computer-executable instructions for executing any method described above.

In the charging method of the present disclosure, only a small area is occupied and the method is easy to operate and use. The method breaks through space limitations during charging, eliminates a user's need of making a special trip to a charging station, changes the user's parking time into a charging time and is suitable for charging electric vehicles parked in a large parking lot.

The system of the present disclosure has a high utilization rate, and can reduce the number of charging spots to be constructed and save distribution network reconstruction costs after popularized.

DETAILED DESCRIPTION

Embodiments of the present disclosure will be further described below with reference to the accompanying drawings.

Embodiment 1

Figure 1:
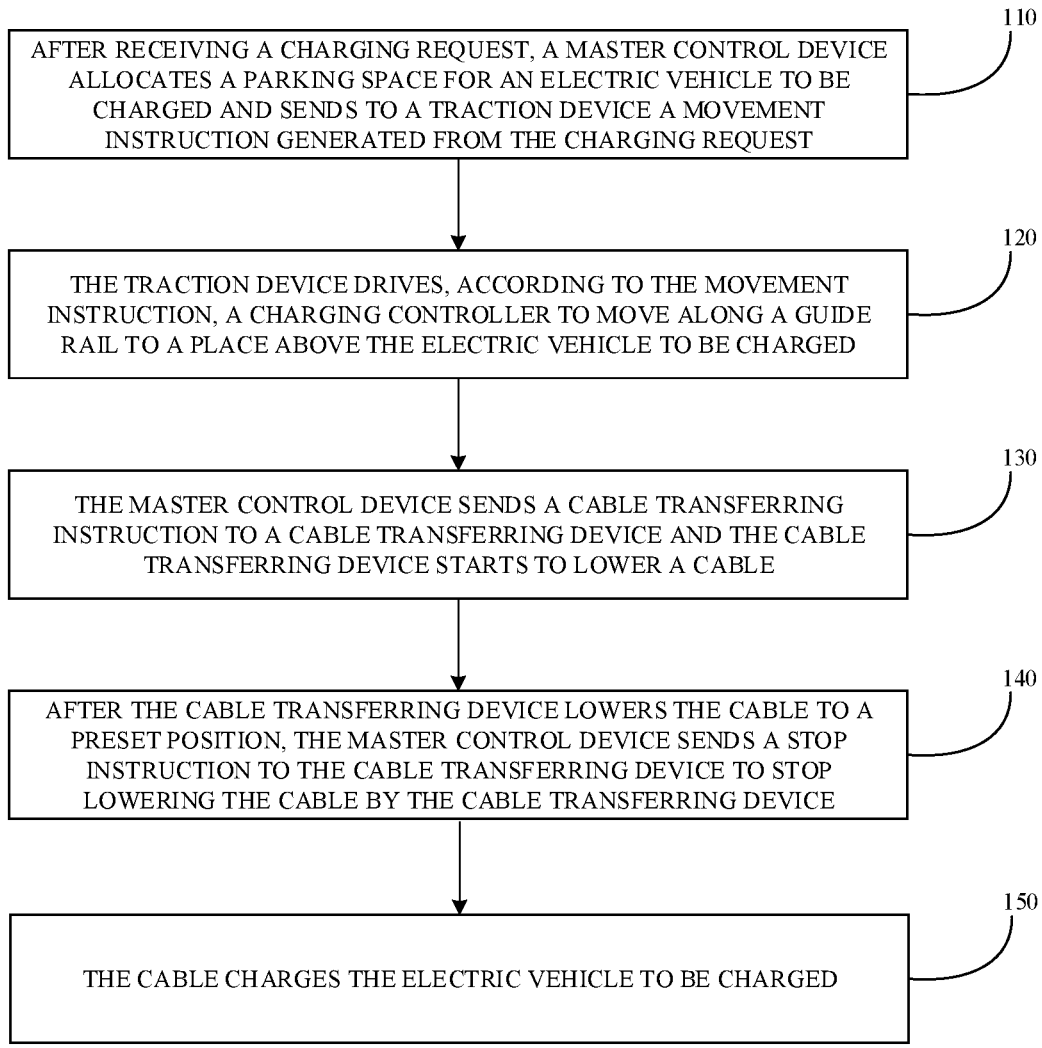
FIG. 1 is a flowchart of a charging method according to an embodiment.

FIG. 1 is a flowchart of a charging method according to an embodiment. As illustrated in FIG. 1, the charging method provided by this embodiment includes steps 110 through 150.

In step 110, after receiving a charging request, a master control device arranges a parking space for an electric vehicle to be charged and sends to a traction device a movement instruction generated from the charging request.

Optionally, after receiving the charging request, the master control device automatically arranges the parking space, sorts received charging requests and sends the movement instruction to the traction device. After receiving the charging request, the master control device sorts the received charging requests according to at least one of the existing order situation, the predicted arrival time, the emergency degree of the charging request, the charging duration, the predicted parking time, the current load of the transformer and whether to accept the expedited fee. A sorting result is adjustable in real time. The charging request may be sent by a mobile APP, a PC or a webpage of a charging website.

In step 120, the traction device drives, according to the movement instruction, a charging controller to move along a guide rail to a place above the electric vehicle to be charged.

In step 130, the master control device sends a cable transferring instruction to a cable transferring device and the cable transferring device starts to lower a cable.

Optionally, after receiving the movement instruction, the traction device drives, according to the movement instruction, the charging controller to move along the guide rail to a place above the electric vehicle to be charged.

The master control device sends the cable transferring instruction to the cable transferring device. The cable transferring device starts to lower the cable.

In step 140, after the cable transferring device lowers the cable to a preset position, the master control device sends a stop instruction to the cable transferring device and the cable transferring device stops lowering the cable.

In step 150, the cable charges the electric vehicle to be charged.

In the charging method of this embodiment, only a small area is occupied and it is easy to operate and use. The method breaks through space limitations during charging, eliminates a user's need of making a special trip to a charging station, changes the user's parking time into a charging time and is suitable for charging electric vehicles parked in a large parking lot.

Embodiment 2

Figure 2:
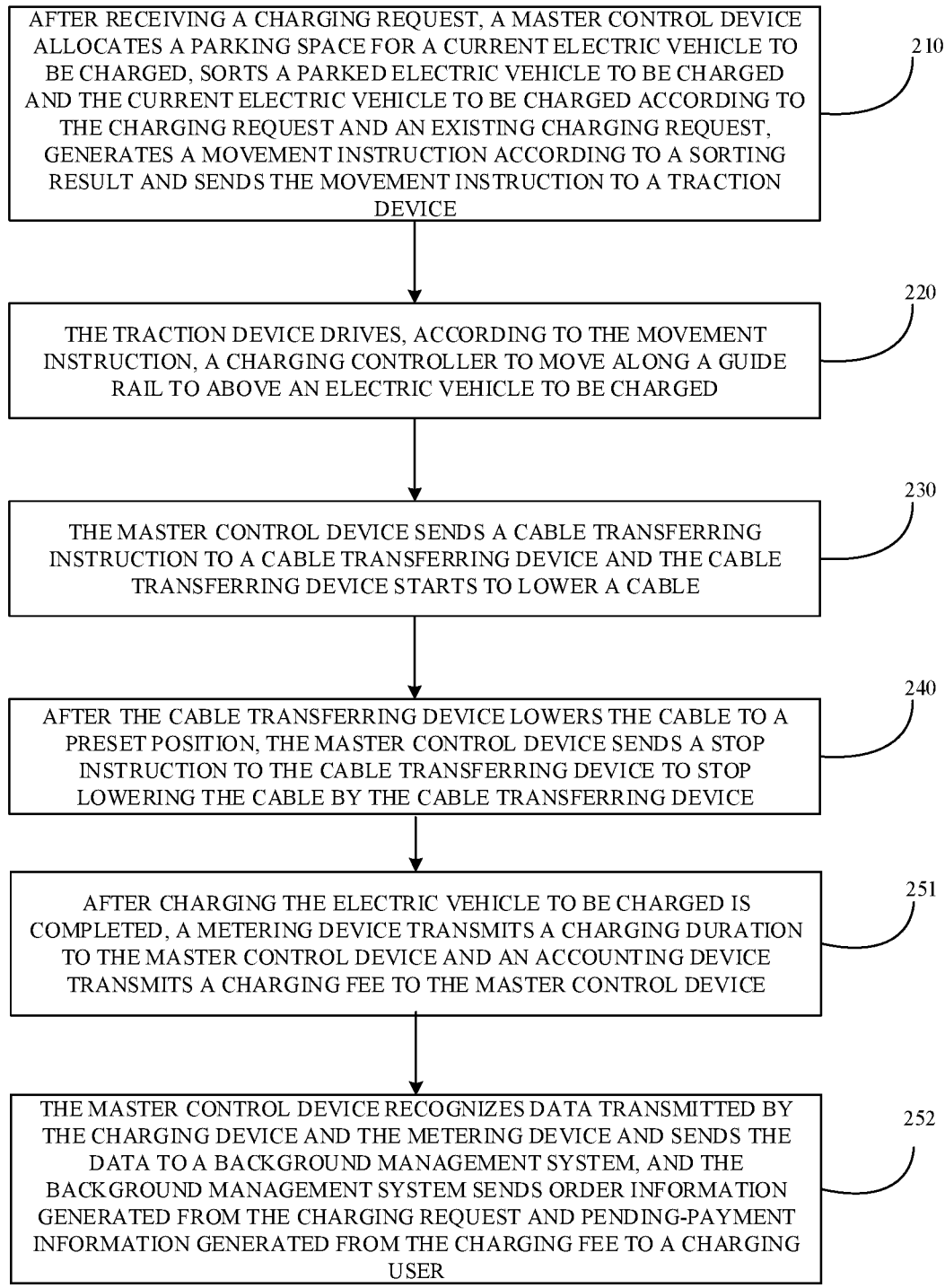
FIG. 2 is a flowchart of another charging method according to an embodiment.

As illustrated in FIG. 2, based on the above embodiment, this embodiment provides another charging method. The method includes steps 210 through 250.

In step 210, after receiving a charging request, a master control device arranges a parking space for a current electric vehicle to be charged, sorts a parked electric vehicle to be charged and the current electric vehicle to be charged according to the charging request and an existing charging request, generates a movement instruction according to a sorting result and sends the movement instruction to a traction device.

Optionally, this step includes steps that the master control device sorts received charging requests according to at least one of an existing order situation, a predicted arrival time, an emergency degree of a charging request, a charging duration, a predicted parking time, a current load of a transformer and a determination on whether to accept an expedited fee.

In step 220, the traction device drives, according to the movement instruction, a charging controller to move along a guide rail to a place above an electric vehicle to be charged.

In step 230, the master control device sends a cable transferring instruction to a cable transferring device and the cable transferring device starts to lower a cable.

In step 240, after the cable transferring device lowers the cable to a preset position, the master control device sends a stop instruction to the cable transferring device and the cable transferring device stops lowering the cable.

In step 250, the cable charges the electric vehicle to be charged.

The charging method of this embodiment breaks through space limitations during charging, eliminates a user's need of making a special trip to a charging station, changes the user's parking time into a charging time.

Optionally, referring to FIG. 2, the step 250 includes steps 251 and 252.

In step 251, after charging the electric vehicle to be charged is completed, a metering device transmits a charging duration to the master control device and an accounting device transmits a charging fee to the master control device.

In step 252, the master control device recognizes data transmitted by the charging device and the metering device and sends the data to a background management system, and the background management system sends order information generated from the charging request and pending-payment information generated from the charging fee to a charging user.

In the charging method of this embodiment, only a small area is occupied and the method is easy to operate and use. The method breaks through space limitations during charging, eliminates a user's need of making a special trip to a charging station, changes the user's parking time into a charging time and is suitable for charging electric vehicles parked in a large parking lot.

Embodiment 3

Figure 3:
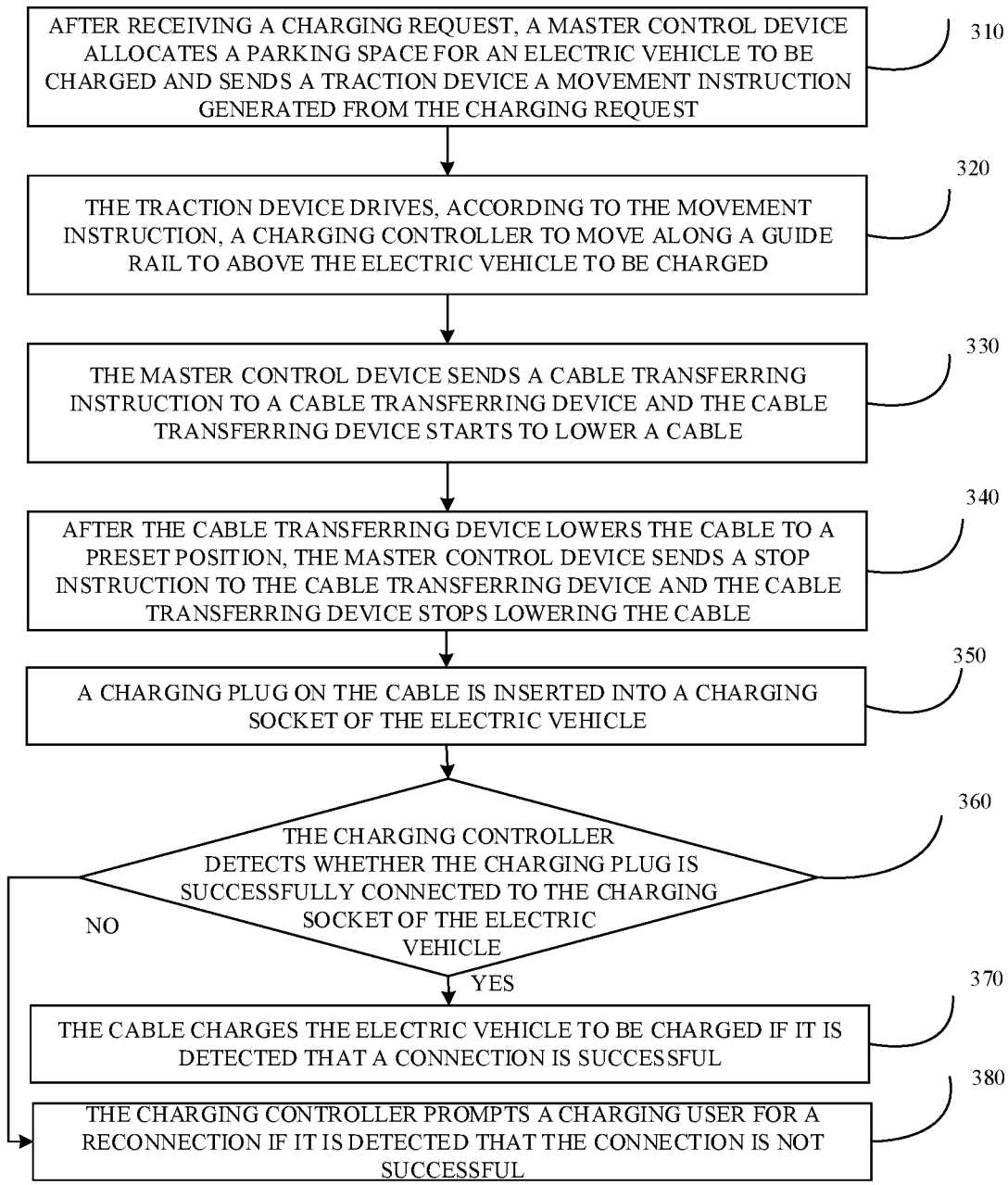
FIG. 3 is a flowchart of another charging method according to an embodiment.

As illustrated in FIG. 3, based on the above embodiment, this embodiment provides another charging method. The method includes steps 310 through 380.

In step 310, after receiving a charging request, a master control device arranges a parking space for an electric vehicle to be charged and sends to a traction device a movement instruction generated from the charging request.

In step 320, the traction device drives, according to the movement instruction, a charging controller to move along a guide rail to a place above the electric vehicle to be charged.

In step 330, the master control device sends a cable transferring instruction to a cable transferring device and the cable transferring device starts to lower a cable.

In step 340, after the cable transferring device lowers the cable to a preset position, the master control device sends a stop instruction to the cable transferring device and the cable transferring device stops lowering the cable.

In step 350, a charging plug of the cable is inserted into a charging socket of the electric vehicle.

In step 360, the charging controller detects whether the charging plug is connected to the charging socket of the electric vehicle.

In step 370, the cable charges the electric vehicle to be charged if it is detected that the connection is successful.

In step 380, the charging controller prompts a charging user for a reconnection if it is detected that the connection is not successful.

In the charging method of this embodiment, only a small area is occupied and the method is easy to operate and use. The method breaks through space limitations during charging, eliminates a user's need of making a special trip to a charging station, changes the user's parking time into a charging time and is suitable for charging electric vehicles parked in a large parking lot.

Embodiment 4

Figure 4:
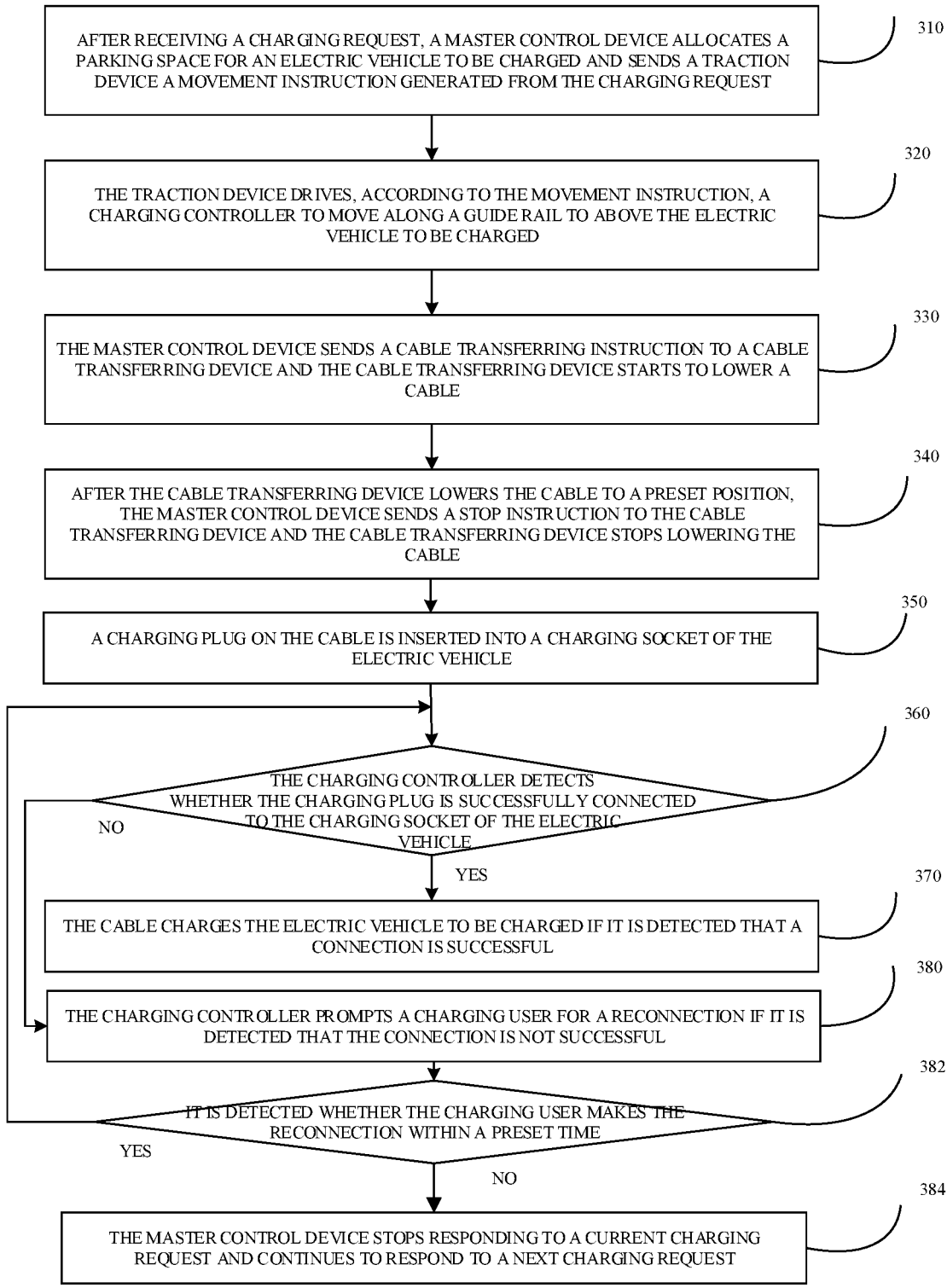
FIG. 4 is a flowchart of another charging method according to an embodiment.

As illustrated in FIG. 4, based on the above embodiment, this embodiment provides another charging method. Unlike the above embodiment, the step 380 includes steps described below.

In step 382, it is detected whether the charging user makes the reconnection for a preset time. Optionally, the preset time is 120 s.

If the connection is made, the method returns to the step 360.

In step 384, if no connection is made, the master control device stops responding to a current charging request and continues to respond to a next charging request.

In the charging method of this embodiment, only a small area is occupied and the method is easy to operate and use. The method breaks through space limitations during charging, eliminates a user's need of making a special trip to a charging station, changes the user's parking time into a charging time and is suitable for charging electric vehicles parked in a large parking lot.

Embodiment 5

Figure 5:
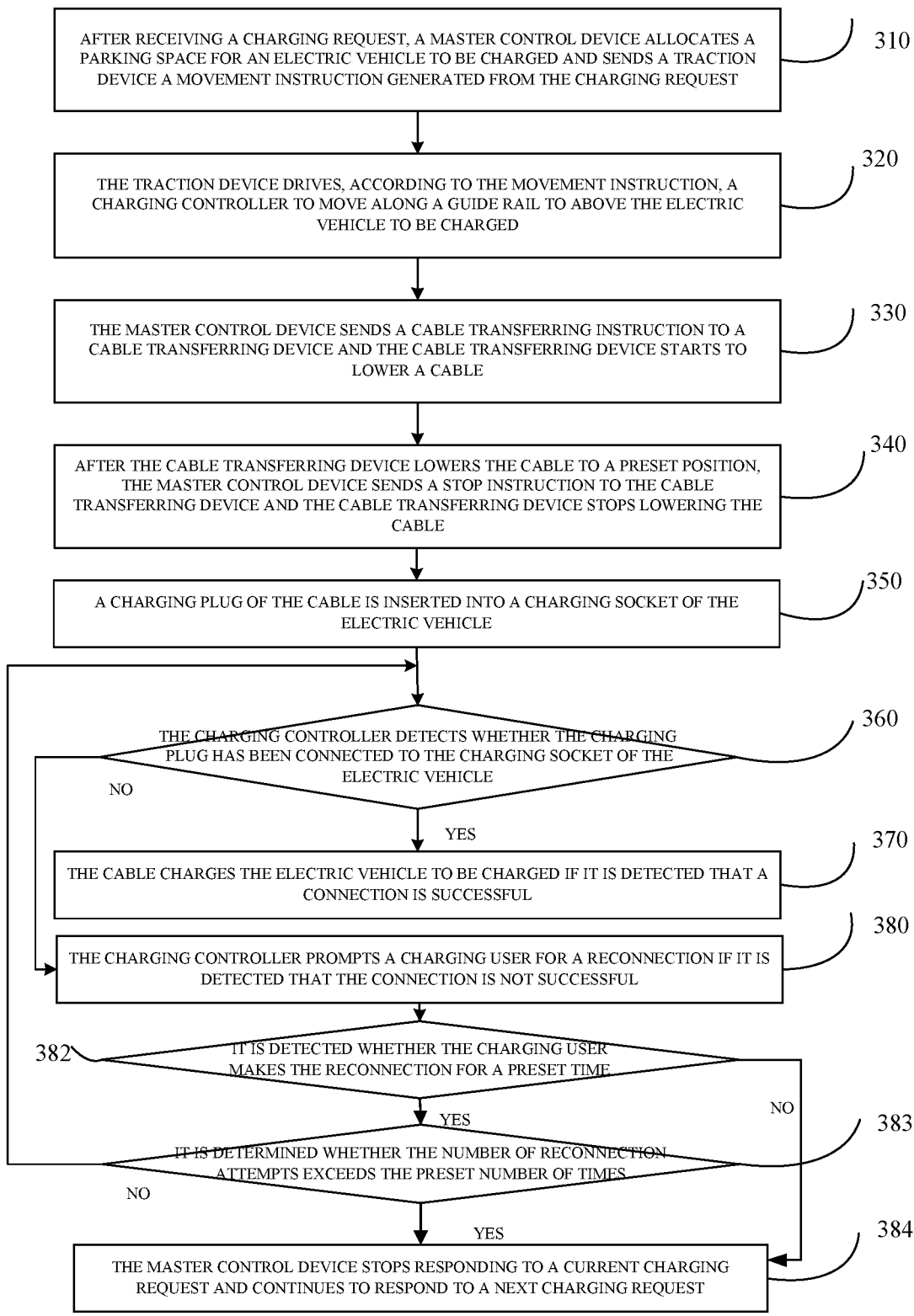
FIG. 5 is a flowchart of another charging method according to an embodiment.

As illustrated in FIG. 5, based on the above embodiment, this embodiment provides another charging method. Unlike the above embodiment, the above step in which if the connection is made, the method returns to the step 360 includes steps described below.

In step 383, it is determined whether the number of reconnection attempts exceeds the preset number of times.

If the preset number of times is not exceeded, the method returns to the step 360.

If the preset number of times is exceeded, the method goes to the step 384. Optionally, the preset number of times is 3.

In the charging method of this embodiment, only a small area is occupied and the method is easy to operate and use. The method breaks through space limitations during charging, eliminates a user's need of making a special trip to a charging station, changes the user's parking time into a charging time and is suitable for charging electric vehicles parked in a large parking lot.

Embodiment 6

Figure 6:
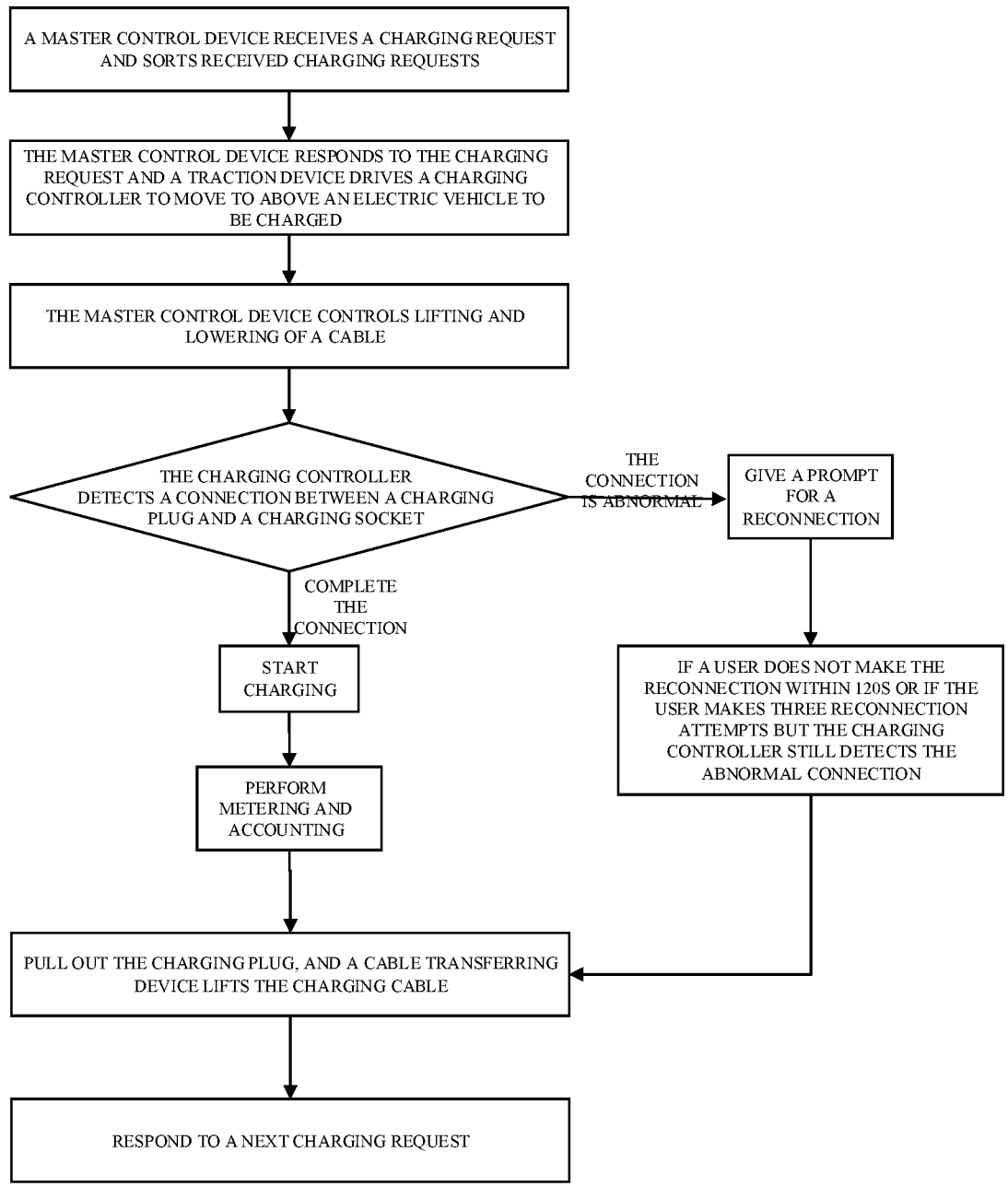
FIG. 6 is a flowchart of another charging method according to an embodiment.

As illustrated in FIG. 6, based on the above embodiment, this embodiment provides another charging method. The method includes the steps described below.

After receiving a charging request, a master control device allocates a parking space for an electric vehicle to be charged and sends to a traction device a movement instruction generated from the charging request.

The traction device drives, according to the movement instruction, a charging controller to move along a guide rail to a place above the electric vehicle to be charged.

The master control device sends a cable transferring instruction to a cable transferring device and hence the cable transferring device starts to lower a cable.

After the cable transferring device lowers the cable to a preset position, the master control device sends a stop instruction to the cable transferring device and hence the cable transferring device stops lowering the cable.

A charging plug on the cable is inserted into a charging socket of the electric vehicle and the charging controller detects whether the charging plug is successfully connected to the charging socket of the electric vehicle.

If it is detected that the connection is successful, the cable charges the electric vehicle to be charged, and after charging the electric vehicle to be charged is completed, a metering device transmits a charging duration to the master control device and an accounting device transmits a charging fee to the master control device; the master control device recognizes data transmitted by the charging device and the metering device and sends the data to a background management system, and the background management system sends order information generated from the charging request and pending-payment information generated from the charging fee to a charging user; and the master control device turns to respond to a next charging request.

If it is detected that the connection is not successful, the charging controller prompts the charging user for a reconnection; and if the user does not make the reconnection for 120 s or if the user makes three reconnection attempts but the charging controller detects that the charging plug is still not successfully connected to the charging socket of the electric vehicle, the master control device turns to respond to a next charging request.

In the charging method of this embodiment, only a small area is occupied and the method is easy to operate and use. The method breaks through space limitations during charging, eliminates a user's need of making a special trip to a charging station, changes the user's parking time into a charging time and is ideal for charging electric vehicles parked in a large parking lot.

Figure 7:
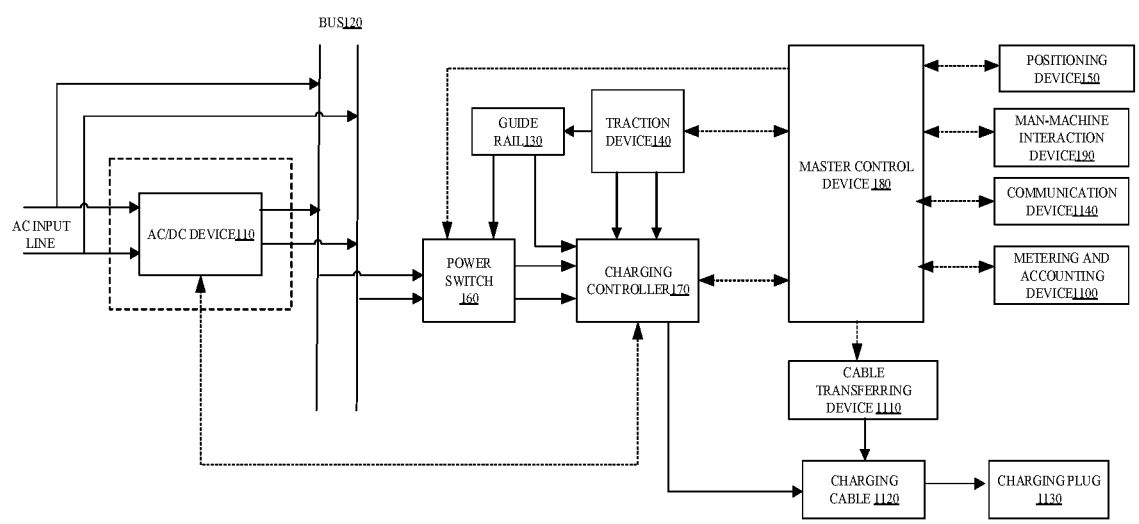
FIG. 7 is a connection diagram of a charging system according to an embodiment.

As illustrated in FIG. 7, embodiments of the present disclosure further provide a charging system. The system includes an AC/DC device 110, a bus 120, a guide rail 130, a traction device 140, a positioning device 150, a power switch 160, a charging controller 170, a master control device 180, a man-machine interaction device 190, a metering and accounting device 1100, a cable transferring device 1110, a charging cable 1120 and a charging plug 1130.

The bus 120 is a DC bus or an AC bus. An AC input line is directly connected to the bus 120 when the bus 120 is the AC bus. The AC input line is connected to the AC/DC device 110 when the bus 120 is the DC bus.

The AC/DC device 110 is connected to the master control device 180 and configured to convert AC power of a distribution network into controllable DC power and transmit generated DC power to a DC bus.

The master control device 180 is connected to the traction device 140 and configured to control movement of the traction device 140.

The traction device 140 is connected to the guide rail 130 and configured to control a movement on the guide rail 130.

Multiple positioning devices 150 are connected to the guide rail 130 and configured to provide position information and transmit the position information to the master control device 180.

The charging controller 170 is located on the guide rail 130 and configured to be driven by the traction device 140 to move along the guide rail 130 to a place above an electric vehicle to be charged.

The charging controller 170 is connected to the master control device 180 and configured to detect a connection between the charging plug 1130 and a charging socket of the electric vehicle, a charging timing sequence and fault handling.

The power switch 160 is connected to the guide rail 130 and the charging controller 170 and configured to control a power connection or a power disconnection of the charging controller 170.

The master control device 180 is connected to the man-machine interaction device 190 and further configured to implement a man-machine interaction function.

The master control device 180 is connected to the cable transferring device 1110 and further configured to control a transfer state of the charging cable 1120 connected to the charging controller 170.

The charging plug 1130 is connected to the charging cable 1120 and inserted into the charging socket of the electric vehicle to charge the electric vehicle.

Optionally, the charging controller 170 includes at least one of an AC charging controller, a DC charging controller and an AC-DC integrated controller. The DC charging controller is configured to control a magnitude of an output voltage.

Optionally, the system further includes a communication device 1140 connected to the master control device 180 and configured for communication between the master control device 180 and a background management system.

Optionally, the metering and accounting device 1100 in the system is connected to the master control device 180 and includes an accounting device and a metering device.

The accounting device is connected to the master control device 180 and configured to transmit a charging fee to the master control device 180.

The metering device is connected to the master control device 180 and configured to transmit a charging duration to the master control device 180.

Embodiments of the present disclosure may take the form of a computer program product implemented in one or more computer-usable storage media (including, but not limited to, a disk memory and an optical memory) that includes computer-usable program codes.

Embodiments of the present disclosure further provide a computer-readable storage medium configured to store computer-executable instructions for executing any method described above.

INDUSTRIAL APPLICABILITY

The charging method of the present disclosure breaks through space limitations during charging, eliminates the need of making a special trip to a charging station and solves the problem in charging electric vehicles parked in a large parking lot. The system of the present disclosure has a high utilization rate, reduces the number of charging spots to be constructed and saves distribution network reconstruction costs.

What is claimed is:

1. A charging method comprising:
    using a master control device, after receiving a charging request, to allocate a parking space for an electric vehicle to be charged and send to a traction device a movement instruction generated from the charging request;
    using the traction device to drive, according to the movement instruction, a charging controller to move along a guide rail to a place above the electric vehicle to be charged;
    using the master control device to send a cable transferring instruction to a cable transferring device and using the cable transferring device to start to lower a cable;
    using the master control device, after lowering the cable to a preset position, to send a stop instruction to the cable transferring device to stop lowering the cable by the cable transferring device; and
    using the cable to charge the electric vehicle to be charged;
    wherein the using the cable to charge the electric vehicle to be charged comprises:
    inserting a charging plug on the cable into a charging socket of the electric vehicle and using the charging controller to detect whether the charging plug is successfully connected to the charging socket of the electric vehicle;
    charging the electric vehicle to be charged if it is detected that the connection is successful; and
    using the charging controller to prompt the charging user for a reconnection if it is detected that the connection is not successful;
    wherein the using the charging controller to prompt the charging user for the reconnection comprises:
    detecting whether the charging user makes the reconnection for a preset time;
    using, if no connection is made, the master control device to stop responding to a current charging request and turn to respond to a next charging request; and
    using, if the connection is made, the charging controller to detect whether the charging plug is successfully connected to the charging socket of the electric vehicle; and
    wherein the using, if the connection is made, the charging controller to detect whether the charging plug is successfully connected to the charging socket of the electric vehicle comprises:
    determining whether the number of reconnections exceeds the preset number of times;
    using, if the number of reconnections exceeds the preset number of times, the master control device to turn to respond to the next charging request; and
    if the number of reconnections does not exceed the preset number of times, using the charging controller to detect whether the charging plug is successfully connected to the charging socket of the electric vehicle.

2. The method of claim 1, wherein the using the master control device after receiving the charging request to allocate the parking space for the electric vehicle to be charged and send the traction device the movement instruction generated from the charging request comprises:
    using the master control device, after receiving the charging request, to allocate the parking space for a current electric vehicle to be charged, sort a parked electric vehicle to be charged and the current electric vehicle to be charged according to the charging request and an existing charging request, generate the movement instruction according to a sorting result and send the movement instruction to the traction device.

3. The method of claim 1, wherein the using the cable to charge the electric vehicle to be charged comprises:
    using a metering device, after charging the electric vehicle to be charged is completed, to transmit a charging duration to the master control device and using an accounting device to transmit a charging fee to the master control device; and
    using the master control device to recognize data transmitted by the charging device and the metering device and send the data to a background management system, and using the background management system to send order information generated from the charging request and pending-payment information generated from the charging fee to a charging user.

4. The method of claim 2, wherein the using the master control device to sort the parked electric vehicle to be charged and the current electric vehicle to be charged according to the charging request and the existing charging request comprises:
    using the master control device to sort the parked electric vehicle to be charged and the current electric vehicle to be charged according to at least one of an existing order situation, a predicted arrival time, an emergency degree of a charging request, a charging duration, a predicted parking time, a current load of a transformer and a determination on whether to accept an expedited fee.

5. The method of claim 3, wherein the charging request is sent by a mobile application (APP), a personal computer (PC) or a webpage of a charging website.

6. A computer-readable storage medium, which is configured to store computer-executable instructions for executing the method of claim 1.

7. A charging system comprising: an AC/DC device, a bus, a guide rail, a traction device, a positioning device, a power switch, a charging controller, a master control device, a man-machine interaction device, a metering and accounting device, a cable transferring device, a charging cable and a charging plug, wherein
the bus is a DC bus or an AC bus, and an AC input line is directly connected to the bus when the bus is the AC bus, and
the AC input line is connected to the AC/DC device when the bus is the DC bus,
wherein the AC/DC device is connected to the master control device and configured to convert AC power of a distribution network into controllable DC power and transmit generated DC power to a DC bus guide rail;
the master control device is connected to the traction device and configured to control movement of the traction device;
the traction device is connected to the guide rail and configured to control movement on the guide rail;
a plurality of positioning devices are connected to the guide rail and configured to provide position information and transmit the position information to the master control device;
the charging controller is located on the guide rail and configured to be driven by the traction device to move along the guide rail to a place above an electric vehicle to be charged;
the charging controller is connected to the master control device and configured to detect a connection between the charging plug and a charging socket of the electric vehicle, a charging timing sequence and fault handling;
the power switch is connected to the guide rail and the charging controller and configured to control a power connection or a power disconnection of the charging controller;
the master control device is connected to the man-machine interaction device and further configured to implement a man-machine interaction function;
the master control device is connected to the cable transferring device and further configured to control a transfer state of the cable connected to the charging controller; and
the charging plug is connected to the cable and inserted into the charging socket of the electric vehicle to charge the electric vehicle.

8. The charging system of claim 7, wherein the charging controller comprises at least one of an AC charging controller, a DC charging controller and an AC-DC integrated controller, wherein
the DC charging controller is configured to control a magnitude of an output voltage.

9. The system of claim 7, further comprising a communication device connected to the master control device and configured for communication between the master control device and a background management system.

10. The system of claim 7, wherein the metering and accounting device is connected to the master control device and comprises an accounting device and a metering device, wherein
the accounting device is connected to the master control device and configured to transmit a charging fee to the master control device; and
the metering device is connected to the master control device and configured to transmit a charging duration to the master control device.

* * * * *